(12) United States Patent
Jiang et al.

(10) Patent No.: US 11,353,771 B2
(45) Date of Patent: Jun. 7, 2022

(54) OPTICAL FREQUENCY CONVERSION METHOD, APPARATUS, AND DEVICE

(71) Applicant: GUANGDONG UNIVERSITY OF TECHNOLOGY, Guangzhou (CN)

(72) Inventors: Xiujuan Jiang, Guangzhou (CN); Zhennan Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/571,573

(22) Filed: Jan. 10, 2022

(65) Prior Publication Data
US 2022/0128884 A1    Apr. 28, 2022

Related U.S. Application Data

(63) Continuation of application No. PCT/CN2020/093898, filed on Jun. 2, 2020.

(30) Foreign Application Priority Data

Aug. 2, 2019 (CN) .......................... 201910713037.1

(51) Int. Cl.
 *G02F 1/35*  (2006.01)
 *G02F 1/365* (2006.01)
(52) U.S. Cl.
 CPC ............ *G02F 1/3544* (2013.01); *G02F 1/365* (2013.01)
(58) Field of Classification Search
 CPC ..................................................... G02F 1/354
 See application file for complete search history.

(56) References Cited

U.S. PATENT DOCUMENTS

| 6,928,099 | B2 | 8/2005 | Ledentsov et al. |
| 7,821,704 | B1 | 10/2010 | Chatterji et al. |
| 8,582,611 | B2 * | 11/2013 | Starodoumov ..... H01S 3/06758 372/27 |
| 9,866,344 | B2 | 1/2018 | Izumi |

OTHER PUBLICATIONS

Q. Wang, H. Rideout, F. Zeng and J. Yao, "Millimeter-Wave Frequency Tripling Based on Four-Wave Mixing in a Semiconductor Optical Amplifier," in IEEE Photonics Technology Letters, vol. 18, No. 23, pp. 2460-2462, Dec. 1, 2006, doi: 10.1109/LPT.2006.886826. (Year: 2006).*

* cited by examiner

*Primary Examiner* — Rhonda S Peace
(74) *Attorney, Agent, or Firm* — True Shepherd LLC; Andrew C. Cheng

(57) ABSTRACT

An optical frequency conversion method, apparatus, and device are provided. Micro-nano fibers and guiding fibers are cascaded, to change an optical frequency conversion manner from using a long micro-nano fiber as a frequency conversion medium to cascading a first quantity of shorter micro-nano fibers and a second quantity of guiding fibers to perform optical frequency conversion. A length of each micro-nano fiber is not greater than a coherence length of a fundamental-frequency pump light signal and a frequency-tripled light signal. The frequency-tripled light generated by cascaded micro-nano fibers is coherently superposed. A phase difference between frequency-tripled light components is controlled by adjusting incident power of the fundamental-frequency pump light, to achieve constructive interference, thereby significantly enhancing the frequency-tripled light signal and effectively improving the optical frequency conversion efficiency.

10 Claims, 11 Drawing Sheets

OPTICAL FREQUENCY CONVERSION METHOD, APPARATUS, AND DEVICE

CROSS-REFERENCE TO RELATED APPLICATIONS

This application is a continuation of International Patent Application No. PCT/CN2020/093898 with a filing date of Jun. 2, 2020, designating the United States, and further claims priority to Chinese Patent Application No. 201910713037.1 with a filing date of Aug. 2, 2019. The content of the aforementioned applications, including any intervening amendments thereto, are incorporated herein by reference.

TECHNICAL FIELD

The present disclosure relates to the field of optical frequency conversion technologies, and in particular, to an optical frequency conversion method, apparatus, and device.

BACKGROUND

Nonlinear optical frequency conversion is an important means to obtain coherent light sources of new wavelengths. At present, optical frequency conversion can be implemented by using multiple types of optical fibers. Micro-nano fiber is one of such optical fibers that has a sub-wavelength diameter and can be prepared by adiabatic stretching of a conventional single-mode optical fiber through a tapering apparatus.

When an optical fiber is used as a frequency conversion medium, a main problem is to improve the conversion efficiency. When a fundamental frequency wave is input to a micro-nano fiber with a suitable diameter, frequency conversion can be implemented through phase matching between different modes. The frequency conversion process is affected by nonlinear effects such as self-phase modulation (SPM) and cross-phase modulation (XPM), so it is also sensitive to pump power of fundamental frequency light. Existing studies have shown that if a micro-nano fiber of a micron- or millimeter-level length is used, the conversion efficiency is rather low due to a limited interaction length between the fundamental frequency light and the harmonics. If a micro-nano fiber of a centimeter-level length is used as a frequency conversion medium and pump power is optimized, the conversion efficiency can be improved to some extent. However, during transmission of an optical signal over the centimeter-level micro-nano fiber, the harmonic power in the optical signal may oscillate in the propagation direction of the optical fiber, making the conversion effect less satisfactory. Therefore, how to effectively improve the optical conversion efficiency is an urgent technical problem to be solved by those skilled in the art.

SUMMARY

The present disclosure provides an optical frequency conversion method, apparatus, and device, to effectively improve the optical conversion efficiency.

In view of this, a first aspect of the present disclosure provides an optical frequency conversion method, including:
connecting a first quantity of micro-nano fibers and a second quantity of guiding fibers sequentially in a manner that each end of each micro-nano fiber is connected with a guiding fiber, to obtain a cascaded fiber;

connecting a pump light source to an input end of the cascaded fiber, and inputting a fundamental-frequency pump light signal to the cascaded fiber through the pump light source;

obtaining, at an output end of the cascaded fiber, a frequency-tripled signal after optical frequency conversion; and determining whether the frequency-tripled optical signal is a primary maximum of multi-beam interference, and if not, adjusting power of the fundamental-frequency pump light signal until the frequency-tripled optical signal reaches the primary maximum of multi-beam interference, wherein a length of each micro-nano fiber is not greater than the coherence length of the fundamental-frequency pump light signal and the frequency-tripled signal.

Preferably, the method further includes:
preparing the micro-nano fiber according to a preset fiber diameter and a preset fiber length.

Preferably, the method further includes: before preparing the micro-nano fiber according to a preset fiber diameter and a preset fiber length,
establishing an eigenvalue equation for hybrid guiding modes in a fiber;

solving the eigenvalue equation to obtain relationships in different modes between an effective refractive index and a fiber core diameter; and using, based on the relationships between the effective refractive index and the fiber core diameter, a fiber core diameter that satisfies phase matching between the fundamental mode of a fundamental frequency and a higher-order mode of the tripled frequency as the preset fiber diameter.

Preferably, the method further includes:
correcting the preset fiber diameter based on a preparation accuracy of the micro-nano fiber and an optical power range of the pump light source.

Preferably, the method further includes: before preparing the micro-nano fiber according to a preset fiber diameter and a preset fiber length,
calculating, based on a propagation constant mismatch between pump light of the pump light source and frequency-tripled light in the micro-nano fiber, the coherence length of the pump light and the frequency-tripled light; and picking a fiber length less than or equal to the coherence length as the preset fiber length.

Preferably, the preset fiber diameter ranges from 765.5 nm to 767 nm.

Preferably, the preset fiber length is 3 mm.

A second aspect of the present disclosure provides an optical frequency conversion apparatus, including:
a connection module, configured to connect a first quantity of micro-nano fibers and a second quantity of guiding fibers sequentially in a manner that each end of each micro-nano fiber is connected with a guiding fiber, to obtain a cascaded fiber;

an access module, configured to connect a pump light source to an input end of the cascaded fiber, and input a fundamental-frequency pump light signal to the cascaded fiber through the pump light source;

an obtaining module, configured to obtain, at an output end of the cascaded fiber, a frequency-tripled signal after optical frequency conversion; and a determining module, configured to determine whether the frequency-tripled optical signal is a primary maximum of multi-beam interference, and if not, adjust power of the fundamental-frequency pump light signal until the frequency-tripled optical signal reaches the primary maximum of multi-beam interference, wherein a length of each micro-nano fiber is not greater than the coherence length of the fundamental-frequency pump light signal and the frequency-tripled signal.

Preferably, the apparatus further includes:

a preparation module, configured to prepare the micro-nano fiber according to a preset fiber diameter and a preset fiber length;

an establishment module, configured to establish an eigenvalue equation for hybrid guiding modes in a fiber;

a solving module, configured to solve the eigenvalue equation to obtain relationships in different modes between an effective refractive index and a fiber core diameter;

a selection module, configured to use, based on the relationships between the effective refractive index and the fiber core diameter, a fiber core diameter that satisfies phase matching between the fundamental mode of a fundamental frequency and a higher-order mode of the tripled frequency as the preset fiber diameter;

a correction module, configured to correct the preset fiber diameter based on a preparation accuracy of the micro-nano fiber and an optical power range of the pump light source;

a calculation module, configured to calculate, based on a propagation constant mismatch between pump light of the pump light source and frequency-tripled light in the micro-nano fiber, the coherence length of the pump light and the frequency-tripled light; and a picking module, configured to pick a fiber length less than or equal to the coherence length as the preset fiber length.

A third aspect of the present disclosure provides an optical frequency conversion device including a processor and a memory, wherein the memory is configured to store program code and transmit the program code to the processor; and the processor is configured to execute any one of the optical frequency conversion method of the first aspect according to instructions in the program code.

From the foregoing technical solutions, the embodiments of the present disclosure have the following advantages:

The present disclosure provides an optical frequency conversion method, including: connecting a first quantity of micro-nano fibers and a second quantity of guiding fibers sequentially in a manner that each end of each micro-nano fiber is connected with a guiding fiber, to obtain a cascaded fiber; connecting a pump light source to an input end of the cascaded fiber, and inputting a fundamental-frequency pump light signal to the cascaded fiber through the pump light source; obtaining, at an output end of the cascaded fiber, a frequency-tripled signal after optical frequency conversion; and determining whether the frequency-tripled optical signal is a primary maximum of multi-beam interference, and if not, adjusting power of the fundamental-frequency pump light signal until the frequency-tripled optical signal reaches the primary maximum of multi-beam interference, where a length of each micro-nano fiber is not greater than the coherence length of the fundamental-frequency pump light signal and the frequency-tripled signal.

In the optical frequency conversion method of the present disclosure, micro-nano fibers and guiding fibers are cascaded to change an optical frequency conversion manner from the existing manner of using a longer micro-nano fiber as a frequency conversion medium to a manner of cascading a first quantity of shorter micro-nano fibers and a second quantity of guiding fibers to perform optical frequency conversion. A length of each micro-nano fiber is not greater than the coherence length of a fundamental-frequency pump light signal and a frequency-tripled optical signal. The frequency-tripled light generated by cascaded micro-nano fibers is coherently superposed. The phase difference between frequency-tripled light components is controlled by adjusting incident power of the fundamental-frequency pump light, to achieve constructive interference, thereby significantly enhancing the frequency-tripled optical signal and effectively improving the optical frequency conversion efficiency.

In addition, the optical frequency conversion method provided in the present disclosure also has following beneficial effects:

(1) When a length of the micro-nano fiber is greater than the coherence length between the fundamental frequency light and the harmonics, the harmonic output signal randomly changes with the incident pump power due to the influence of the surface roughness of the micro-nano fiber, making the frequency conversion process difficult to predict and control. The present disclosure is based on the coherent superposition of frequency-tripled light generated by cascaded micro-nano fibers. The overall characteristics of the output frequency-tripled signal depend on the characteristics of coherent superposition, which reduces the randomness caused by the surface roughness of the cascaded micro-nano fibers, reshapes the irregular change of the frequency-tripled signal with the incident pump power into a regular change, and improves the controllability of the frequency conversion process.

(2) It is difficult to prepare a micro-nano fiber with a length of over 1 cm by using the existing fiber tapering apparatus, so using a long micro-nano fiber as a frequency conversion medium may bring about difficulties in fiber preparation. In the present disclosure, cascaded micro-nano fibers and guiding fibers are used in place of a longer micro-nano fiber as a frequency conversion medium, reducing the difficulty of preparing the micro-nano fiber.

(3) In a shorter micro-nano fiber, the competitive nonlinear processes of frequency conversion will be suppressed, so that spectral characteristics of an output frequency-tripled signal will be improved.

Figure 1:
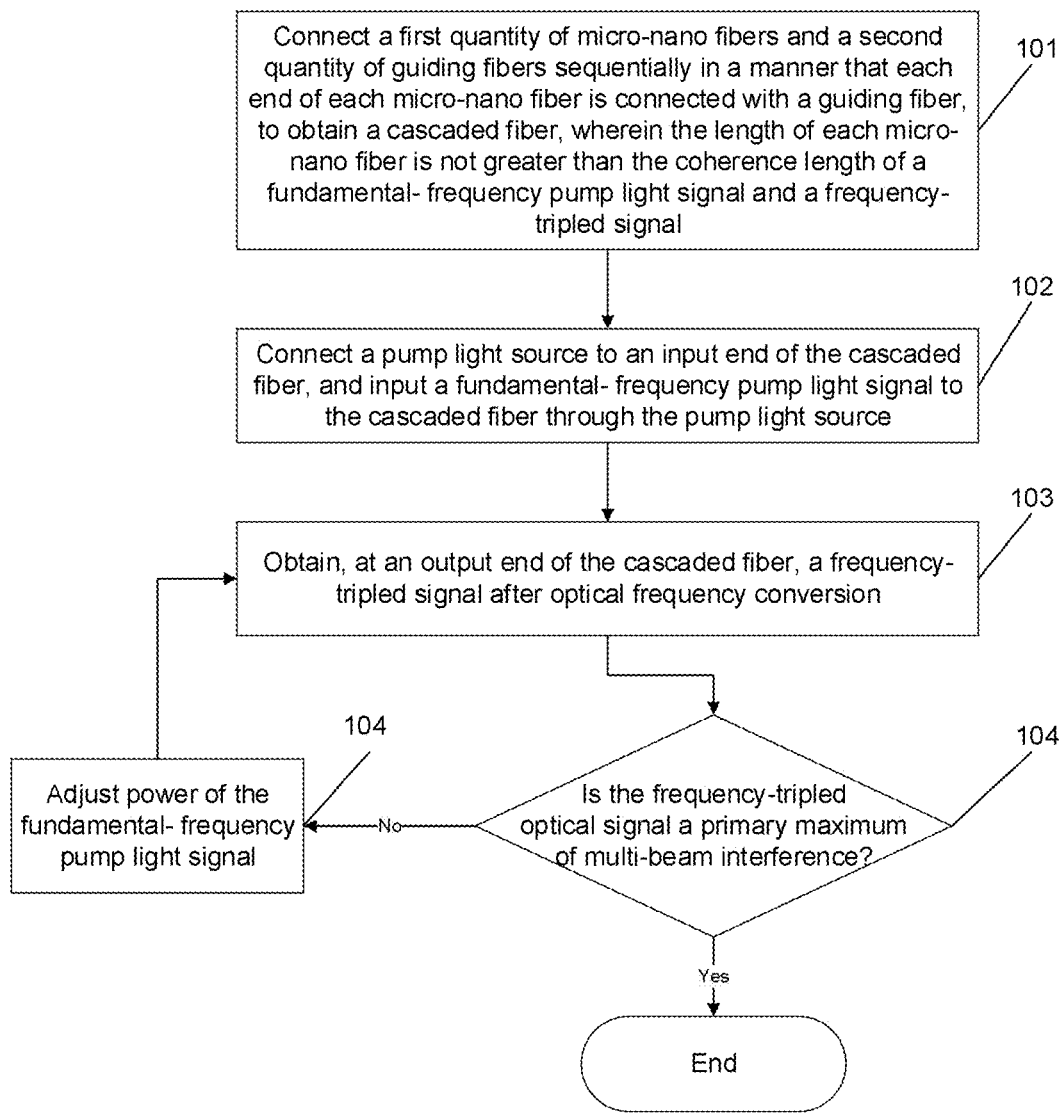
FIG. 1 is a schematic flowchart of an optical frequency conversion method according to one embodiment of the present disclosure.

Reference numerals in the drawings are as follows:
401. guiding fiber; and 402. micro-nano fiber.

DETAILED DESCRIPTION OF THE EMBODIMENTS

To enable those skilled in the art to better understand the solutions of the present disclosure, the technical solutions in the embodiments of the present disclosure will be clearly and completely described below in conjunction with the accompanying drawings in the embodiments of the present disclosure. Obviously, the described embodiments are only a part of, not all of, the embodiments of the present disclosure. All other embodiments obtained by those of ordinary skill in the art based on the embodiments of the present disclosure without creative efforts should fall within the protection scope of the present disclosure.

Figure 4:
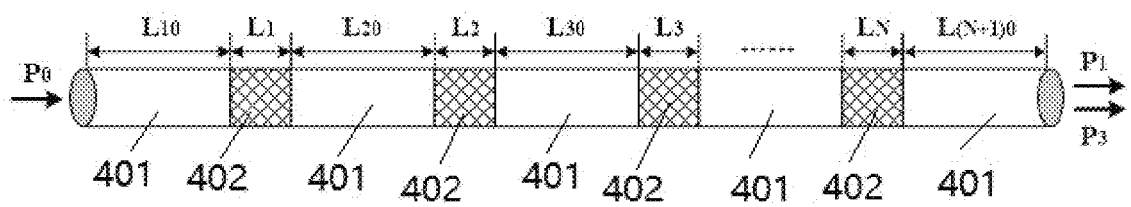
FIG. 4 is a schematic structural diagram of a cascaded fiber according to an embodiment of the present disclosure.

For ease of understanding, referring to FIG. 1 and FIG. 4, an embodiment of the present disclosure provides an optical frequency conversion method, including the following steps.

Step 101. Connect a first quantity of micro-nano fibers and a second quantity of guiding fibers sequentially in a manner that each end of each micro-nano fiber is connected with a guiding fiber, to obtain a cascaded fiber.

The length of each micro-nano fiber is not greater than the coherence length of a fundamental-frequency pump light signal and a frequency-tripled signal.

Step 102. Connect a pump light source to an input end of the cascaded fiber, and input a fundamental-frequency pump light signal to the cascaded fiber through the pump light source.

Step 103. Obtain, at an output end of the cascaded fiber, a frequency-tripled signal after optical frequency conversion.

It should be noted that the optical fiber to which the optical frequency conversion method provided in the embodiment of the present disclosure is applicable includes, but is not limited to, a micro-nano fiber. A micro-nano fiber is a kind of fiber with a sub-wavelength diameter formed through adiabatic stretching of a conventional single-mode fiber.

In the embodiment of the present disclosure, it is necessary to obtain a cascaded fiber composed of a first quantity of micro-nano fibers and a second quantity of guiding fibers, as shown in FIG. 4. In FIG. 4, $L_1, L_2, L_3, \ldots, L_N$ are lengths of the micro-nano fibers, $L_{10}, L_{20}, L_{30}, \ldots, L_{(N+1)0}$ are lengths of the guiding fibers, $P_0$ is incident light power of the fundamental-frequency pump light at the input end of the cascaded fiber, and $P_1$ is remaining power of the fundamental-frequency pump light at the output end of the cascaded fiber, and $P_3$ is output power of the frequency-tripled light. A micro-nano fiber and a guiding fiber following the micro-nano fiber constitute a functional unit. To ensure good coupling between the cascaded fiber and other optical devices, an input end and an output end of the cascaded fiber are generally guiding fibers. A manner for connecting the micro-nano fiber and the guiding fiber includes but is not limited to fiber splicing, fiber connector, and the like.

The optical frequency conversion in the present disclosure includes but is not limited to second harmonic generation, third harmonic generation, four-wave mixing, and the like. To better realize the technical effect of the technical solution of the present disclosure, the present disclosure takes a frequency-tripled signal generated by third harmonics of pump light in a silica micro-nano fiber as an example. A pump light source is connected to the input end of the cascaded fiber, and a fundamental-frequency pump light signal is input to the cascaded fiber through the pump light source. The fundamental-frequency pump light signal undergoes frequency conversion in the cascaded fiber, and a frequency-tripled optical signal is output at the output end of the cascaded fiber.

In the existing research, when a longer micro-nano fiber is used as an optical frequency conversion medium, the length of the micro-nano fiber is already greater than the actual coherence length of the fundamental-frequency pump light signal and the frequency-tripled optical signal, and the frequency-tripled optical power may oscillate irregularly, restricting the frequency conversion efficiency and making the frequency-tripled output uncontrollable. Therefore, in the embodiments of the present disclosure, the length of each micro-nano fiber is set to be not greater than the coherence length of the fundamental-frequency pump light signal and the frequency-tripled signal.

Step 104. Determine whether the frequency-tripled optical signal is a primary maximum of multi-beam interference, and if not, adjust power of the fundamental-frequency pump light signal until the frequency-tripled optical signal reaches the primary maximum of multi-beam interference.

It should be noted that in the actual frequency conversion process, optical power of the harmonic may have multiple primary maxima and multiple secondary maxima, and this step only requires that any of the primary maxima is reached. Which level of the primary maxima to be outputted can also be selected according to actual needs. If the optical power of the harmonic generated by the cascaded fiber reaches the primary maximum, the harmonic conversion efficiency also reaches the primary maximum, and there is no need to adjust the incident pump power. If the optical power of the harmonic does not reach the primary maximum, the harmonic conversion efficiency does not reach the primary maximum, and adjustment needs to be performed by using a power amplification unit and a power reduction unit. To determine whether the output optical power of the harmonic is the primary maximum, a usable measurement device includes, but is not limited to, an optical power meter, a spectrum analyzer, and the like. To achieve more accurate adjustment of the incident pump power, the incident pump power may be adjusted multiple times to determine the incident pump power.

According to the optical frequency conversion method in this embodiment of the present disclosure, micro-nano fibers and guiding fibers are cascaded to change an optical frequency conversion manner from the existing manner of using a longer micro-nano fiber as a frequency conversion medium to a manner of cascading a first quantity of shorter micro-nano fibers and a second quantity of guiding fibers to perform optical frequency conversion. A length of each micro-nano fiber is not greater than the coherence length of a fundamental-frequency pump light signal and a frequency-tripled optical signal. The frequency-tripled light generated by cascaded micro-nano fibers is coherently superposed. The phase difference between frequency-tripled light components is controlled by adjusting incident power of the fundamental-frequency pump light, so that constructive interference is achieved and the primary maximum is reached, thereby significantly enhancing the frequency-tripled optical signal and effectively improving the optical frequency conversion efficiency.

Figure 2:
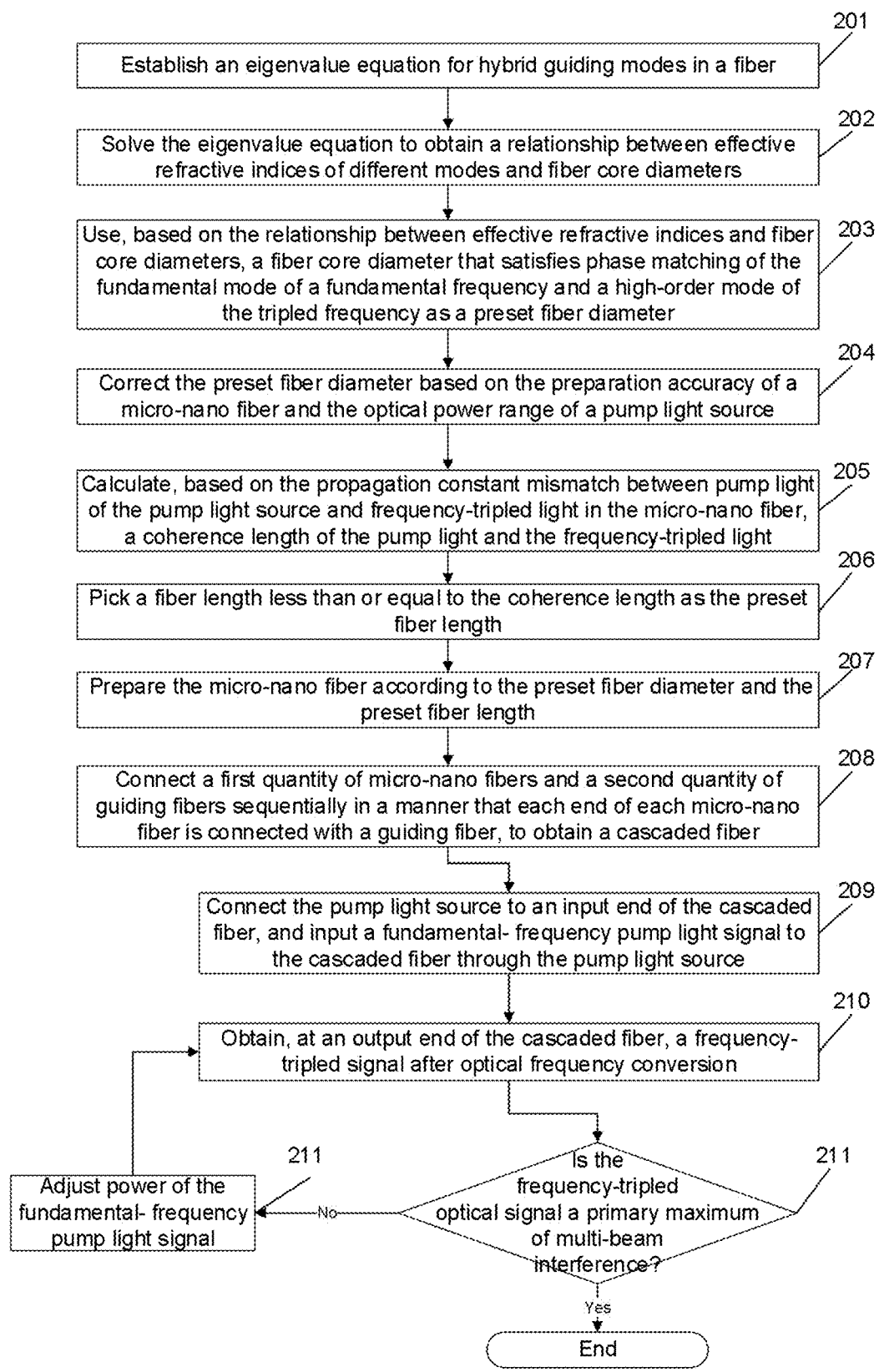
FIG. 2 is a schematic flowchart of an optical frequency conversion method according to another embodiment of the present disclosure.

For ease of understanding, referring to FIG. 2, the present disclosure provides another embodiment of an optical frequency conversion method, including the following steps.

Step 201. Establish an eigenvalue equation for hybrid guiding modes in a fiber.

Step 202. Solve the eigenvalue equation to obtain relationships in different modes between the effective refractive index and the fiber core diameter.

Step 203. Select, based on the relationships between the effective refractive index and the fiber core diameter, a fiber core diameter that satisfies phase matching between the fundamental mode of a fundamental frequency and a higher-order mode of the tripled frequency as a preset fiber diameter.

It should be noted that in this embodiments of the present disclosure, structural parameters of the micro-nano fiber (that is, an optical frequency conversion fiber) need to be designed first, and the structural parameters include the core diameter and the length of the fiber. A material of the micro-nano fiber is selected. The material of the micro-nano fiber is silicon dioxide ($SiO_2$), outside the fiber is air, and a typical nonlinear refractive index coefficient of $SiO_2$ is $$n^{(2)} = 2.7 \times 10^{-20} m^2/W.$$

The eigenvalue equation in the embodiments of the present disclosure is an equation commonly used in the field of optics. It is assumed that the speed of light in vacuum is c, an angular frequency of light is $\omega$, a wavelength is $\lambda$, and a propagation constant is $k=2\pi/\lambda$. It is assumed that a refractive index of the core of a step-index fiber is $n_1$, a refractive index of the cladding is $n_2$, and a diameter of the core is d. A propagation constant of light guiding mode in the optical fiber is $\beta = (\omega/c)n^{\mathit{eff}}$, wherein $n^{\mathit{eff}}$ is the effective refractive index of the corresponding mode in the optical fiber. It is assumed that a normalized radial phase constant of the guiding mode is U, a normalized radial attenuation constant of the guiding mode is W, and a normalized frequency of the fiber is V. Their expressions are as follows:

$$U = \frac{d}{2}\sqrt{k^2 n_1^2 - \beta^2} \tag{1}$$

$$W = \frac{d}{2}\sqrt{\beta^2 - k^2 n_2^2} \tag{2}$$

$$V^2 = U^2 + W^2 \tag{3}$$

The hybrid guiding modes in the optical fiber are $HE_{vm}$ and $EH_{vm}$, wherein v and m represent an angular ordinal and a radial ordinal of the mode, respectively. J represents a Bessel function of the first kind, and K represents a modified Bessel function of the second kind. The eigenvalue equation of the hybrid guiding mode is as follows:

$$\left[\frac{J'_v(U)}{UJ_v(U)} + \frac{K'_v(U)}{WK_v(U)}\right]\left[\frac{J'_v(U)}{UJ_v(U)} + \left(\frac{n_2}{n_1}\right)^2 \frac{K'_v(W)}{WK_v(W)}\right] = \left(\frac{v\beta}{kn_1}\right)^2 \left(\frac{V}{UW}\right)^4 \tag{4}$$

Figure 14:
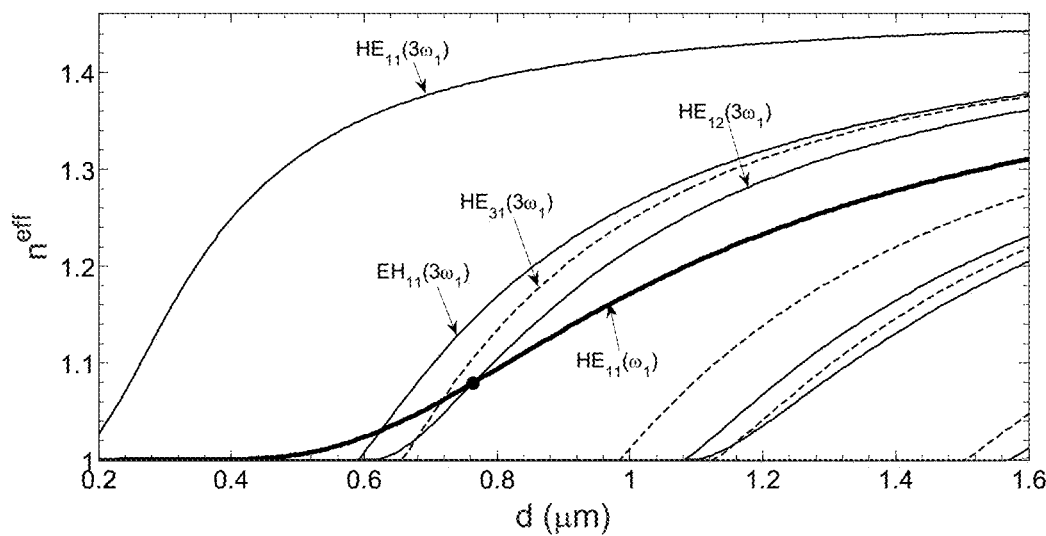
FIG. 14 is a diagram showing effective refractive indices of fundamental-mode fundamental-frequency light $HE_{11}$ ($\omega_1$) and frequency-tripled light in different modes against the diameter of a silica fiber.

The eigenvalue equation is solved by using a numerical method, to obtain relationships in different modes between propagation constants $\beta$ or effective refractive index $n^{\mathit{eff}}$ and fiber core diameter d, and to obtain a first fiber diameter. The key to obtaining high-efficiency frequency conversion is that the fundamental frequency light and the frequency-tripled light meet the phase matching condition. The eigenvalue equation is solved, to obtain a relationship that the effective refractive index of the fundamental frequency light $HE_{11}$ ($\omega_1$) in fundamental mode and the frequency-tripled light in different modes change with the diameter of the micro-nano fiber, as shown in FIG. 14. A thick solid line in FIG. 14 represents the fundamental frequency light of fundamental mode, and a thin solid line and a thin dashed line represent the frequency-tripled light. From FIG. 14, a fiber diameter at an intersection of the fundamental mode $HE_{11}$ ($\omega_1$) of the fundamental frequency and the mode $HE_{12}(3\omega_1)$ of the tripled frequency, $d_1=766.48$ nm, can be obtained. At this point, the two wave modes have the same effective refractive index, that is, their linear propagation constants in the micro-nano fiber are the same, which roughly meets the phase matching condition. The fiber diameter is the preset fiber diameter of the micro-nano fiber.

Step 204. Correct the preset fiber diameter based on the preparation accuracy of the micro-nano fiber and the optical power range of the pump light source.

It should be noted that the preset fiber diameter obtained in step 203 is a roughly estimated value, not a final diameter of the micro-nano fiber. On the basis that the preset fiber diameter has been obtained, the preset fiber diameter can be corrected based on the fiber preparation accuracy and the power range of the fundamental-frequency pump light to be used for frequency conversion, to obtain the corrected preset fiber diameter. The process is as follows:

Fundamental-frequency pump light is incident into the cascaded fiber, and third harmonics are generated through nonlinear interaction, thereby frequency-tripled light is output. It is assumed that the propagation direction of light along the fiber is z, the angular frequency of the pump light is $\omega_1$, and the angular frequency of the frequency-tripled light is $\omega_3=3\omega_1$. Then their propagation constants in the fiber are $\beta_1=(\omega_1/c)n_1^{\mathit{eff}}$ and $\beta_3=(\omega_3/c)n_3^{\mathit{eff}}$ respectively. Assuming that a pump light field is quasi-continuous, the third harmonic generation process is described by using the following coupled-mode equations:

$$\frac{\partial A_1}{\partial z} = -\alpha_1 A_1 + in^2 k_1 \left[ (j_1|A_1|^2 + 2j_2|A_3|^2)A_1 + j_3 A_1^{*2} A_3 \exp(i\delta\beta z) \right] \quad (5)$$

$$\frac{\partial A_3}{\partial z} = -\alpha_3 A_3 + in^2 k_1 \left[ (6j_2|A_1|^2 + 3j_5|A_3|^2)A_3 + j_3^* A_1^3 A_3 \exp(i\delta\beta z) \right] \quad (6)$$

wherein $A_1$ and $A_3$ are amplitudes of the pump light and the frequency-tripled light respectively, and the square values of their modulus are their respective powers, that is, $|A_1|^2 = P_1$, and $|A_3|^2 = P_3$;

wherein $\alpha_1$ and $\alpha_3$ are loss coefficients of the pump light and the frequency-tripled light in the fiber respectively, $n^{(2)}$ is the nonlinear refractive index coefficient of the fiber, $k_1$ is the propagation constant of the pump light in vacuum, and $\delta\beta = \beta_3 - 3\beta_1$ is the propagation constant mismatch of the pump light and the frequency-tripled light in the fiber. j is the nonlinear overlap integral of the optical fields, and its value is determined by the optical field distribution corresponding to the two guiding modes and the fiber diameter, where $j_3$ is the overlap integral between the pump light and the frequency-tripled light, $j_1$ and $j_5$ reflect SPM effects of the pump light and the frequency-tripled light respectively, and $j_2$ reflects XPM effect between the pump light and the frequency-tripled light.

Due to the SPM/XPM effect in the harmonic conversion process, a total propagation constant mismatch may be expressed as follows:

$$\delta\beta_{tol}(z) = \delta\beta(z) + \delta\beta_{NL}(z) \quad (7)$$

wherein $\delta\beta$ is the linear part. For a particular guiding mode, $\delta\beta$ depends on the core diameter d of the micro-nano fiber, which can be obtained by solving the eigenvalue equation. Optical fiber has a manufacturing accuracy and inevitably has surface roughness. Therefore, the actual fiber core diameter may be expressed as $d = d_0 + \Delta d + \delta d(z)$, where $d_0$ is an expected value, $\Delta d$ is the average deviation between the actual value and the expected value, and $\delta d(z)$ is a random diameter fluctuation. Therefore, after the micro-nano fiber is prepared, $\delta\beta$ is roughly determined, but it is not a constant and randomly fluctuates slightly along the propagation direction z of the micro-nano fiber. $\delta\beta_{NL}$ is the nonlinear part produced by SPM and XPM, and may be expressed as follows:

$$\delta\beta_{NL}(z) = 3k_1 n^{(2)} [(2j_2 - j_1)P_1(z) + (j_5 - 2j_2)P_3(z)] \quad (8)$$

Assuming that the incident power of the pump light is $P_1(z=0) = P_0$, both the pump light power $P_1(z)$ and the frequency tripled power $P_3(z)$ in the frequency conversion process are related to it; and the nonlinear overlap integral j is related to the fiber core diameter d. Obviously, the fiber core diameter d and the incident power $P_0$ of the pump light will jointly affect the total propagation constant mismatch $\delta\beta_{tol}$, thereby affecting the conversion efficiency of the tripled frequency.

In practice, the linear random phase mismatch caused by fiber roughness and the nonlinear phase shift introduced by the SPM/XPM effect are great enough to reduce the frequency conversion efficiency by several orders of magnitude. Therefore, to obtain efficient frequency conversion in practical applications, the above influencing factors need to be considered in system design.

Assuming that the frequency conversion efficiency is $\eta = P_3/P_0$, the relationship $\eta - d - P_0$ may be obtained by solving equations (4), (5), and (6) using numerical methods. On the basis that the preset fiber diameter has been obtained, the preset fiber diameter can be corrected based on the fiber preparation accuracy and the power range of the incident pump light to be used, to obtain the corrected preset fiber diameter, and the fiber is manufactured according to the corrected preset fiber diameter.

Step 205. Calculate, based on the propagation constant mismatch between pump light of the pump light source and frequency-tripled light in the micro-nano fiber, a coherence length of the pump light and the frequency-tripled light.

Step 206. Pick a fiber length less than or equal to the coherence length as the preset fiber length.

It should be noted that in the embodiments of the present disclosure, a length of the micro-nano fiber needs to be designed, including: calculating the coherence length of the fundamental frequency light and the frequency-tripled light, and estimating an optimized fiber length based on the coherence length so that the fiber can be manufactured according to the optimized fiber length.

The coherence length of the fundamental frequency light and the frequency-tripled light is:

$$L_c = \frac{\pi}{\delta\beta_{tol}} \quad (9)$$

According to the relationship $\eta - d - P_0$ in step 204, a set of optimized (d, $P_0$) values may be determined, and substituted into equation (8) and equation (7), to estimate the total propagation constant mismatch $\delta\beta_{tol}$ based on the eigenvalue equation (4), so as to calculate the coherence length $L_c$ by using equation (9). If a length of the frequency conversion fiber is less than the coherence length, intensity of the frequency-tripled signal may increase monotonously along the propagation direction; if the length of the frequency conversion fiber is greater than the coherence length, the frequency-tripled signal irregularly oscillates along the propagation direction. To make the frequency conversion process controllable, the length of the frequency conversion fiber should not be greater than the coherence length (to maximize the frequency-tripled signal, an optimal length of the micro-nano fiber is equal to the coherence length).

It is understandable that in practice, the total propagation constant mismatch $\delta\beta_{tol}$ cannot be accurately obtained. The coherence length calculated according to equation (9) is only a roughly estimated value, and needs to be corrected by numerical simulation and test. Numerical simulation is to obtain a changing trend of the frequency tripling efficiency in the fiber propagation direction by solving equations (5) and (6), that is, the relationship $\eta - z$. If the relationship is monotonous increase, the fiber length is not greater than the coherence length and can be used; if the tripled frequency signal reaches the maximum and then oscillates, the fiber length should be corrected to a smaller value. Test can be performed to measure the changing trend of the frequency-tripled signal output by the fiber of the length along with the incident pump power, that is, the relationship $\eta - P_0$. If the relationship is monotonic increase, the fiber length is not greater than the corresponding coherence length in the range of the pump power used. In the test, a frequency tripled output spectrum can also be measured. If the spectrum is not broadened, in the frequency conversion fiber of this length, other competitive nonlinear physical processes are not excited, and the fiber length is applicable in practice; if the spectrum is broadened, the fiber length should be corrected to a smaller value.

In addition, the designed frequency conversion fiber length should be achievable on a to-be-used fiber manufacturing device. Apparently, a longer coherence length is more helpful to frequency conversion efficiency improvement. However, it can be seen from equation (9) that a longer coherence length means a smaller allowable total propagation constant mismatch, or a smaller allowable deviation between the actual and expected core diameter values of the micro-nano fiber and a higher requirement for the manufacturing accuracy of the fiber manufacturing device. Therefore, the manufacturing accuracy of the to-be-used fiber manufacturing device should be fully considered in design of the frequency conversion fiber length.

Step 207. Prepare the micro-nano fiber according to a preset fiber diameter and a preset fiber length.

It should be noted that, in the embodiments of the present disclosure, after the preset fiber diameter and the preset fiber length of the micro-nano fiber are obtained, the micro-nano fiber is prepared according to the preset fiber diameter and the preset fiber length, where the preset fiber diameter may be the preset fiber diameter obtained in step 203 or the corrected preset fiber diameter obtained in step 204.

Step 208. Connect a first quantity of micro-nano fibers and a second quantity of guiding fibers sequentially in a manner that each end of each micro-nano fiber is connected with a guiding fiber, to obtain a cascaded fiber.

The length of each micro-nano fiber is not greater than the coherence length of the fundamental-frequency pump light signal and the frequency-tripled signal.

Step 209. Connect a pump light source to an input end of the cascaded fiber, and input a fundamental-frequency pump light signal to the cascaded fiber through the pump light source.

Step 210. Obtain, at an output end of the cascaded fiber, a frequency-tripled signal after optical frequency conversion.

It should be noted that step 208 to step 210 in this embodiment of the present disclosure are consistent with step 101 to step 103 in the previous embodiment, and details are not described herein again.

Step 211. Determine whether the frequency-tripled optical signal is a primary maximum of multi-beam interference, and if not, adjust power of the fundamental-frequency pump light signal until the frequency-tripled optical signal reaches the primary maximum of multi-beam interference.

It should be noted that, assuming that the pump power incident to the cascaded fiber is $P_0 = |A_0|^2$, since a pump light loss of the guiding fiber is small, the pump power to an incident surface of the first frequency conversion fiber is still approximately $P_0$; similarly, assuming that a pump amplitude transmittance of each functional unit is T, the frequency tripled power conversion efficiency of each frequency conversion fiber is $\eta_0$. According to the existing research results, $\eta_0 \approx gP_0$, where g is a coefficient determined by parameters such as the nonlinear refractive index coefficient $n^{(2)}$ of the fiber and the nonlinear overlap integral $j_3$ between the pump light and the frequency-tripled light. When the pump light passes through the n-th (n=1, 2, . . . , N) frequency conversion fiber, the frequency-tripled light with a complex amplitude of $A_{3n}$ is generated separately, and a frequency tripled complex amplitude output at the end of the cascade system is the add-up of all frequency tripled complex amplitudes.

For simplicity, assuming that $L_1=L_2=L_3= \ldots =L_N=L$ and $L_{10}=L_{20}=L_{30}= \ldots =L_{(N+1)0}=L_0$, the frequency tripled complex amplitude output at the end of the cascade system may be expressed as follows:

$$A_3 = A_{31} + A_{32} + \cdots + A_{3N} \quad (10)$$
$$= A_0\sqrt{\eta_0}\{1 + T\exp(i\Delta) + T^2\exp(i2\Delta) + \cdots + T^{N-1}\exp[i(N-1)\Delta]\}$$
$$= A_0\sqrt{\eta_0}\left[\frac{1 - T^N\exp(iN\Delta)}{1 + T\exp(i\Delta)}\right]$$

wherein $\Delta$ is the phase difference of frequency-tripled light generated from two adjacent frequency conversion fibers. $\Delta$ is actually a phase change when the frequency-tripled light passes through a functional unit. If the dynamic changes of the pump light and the frequency-tripled light with the transmission distance are ignored, it may be approximately expressed as follows:

$$\begin{aligned}\Delta = &\ [\beta_{30}L_0 + k_3n^{(2)}(j_{50}P_3 + 2j_{20}P_1)L_0] + \\ &\ [\beta_3 L + k_3n^{(2)}(j_5 P_3 + 2j_2 P_1)L] \\ \approx &\ [\beta_{30}L_0 + k_3n^{(2)}(j_{50}\eta_0 P_0 + 2j_{20}T^2 P_0)L_0] + \\ &\ [\beta_3 L + k_3n^{(2)}(j_5\eta_0 P_0 + 2j_2 T^2 P_0)L]\end{aligned} \quad (11)$$

In equation (11), the first square bracket is the phase change caused by the tripled frequency through the guiding fiber, including the part caused by linear transmission and the part caused by nonlinear modulation SPM/XPM; similarly, the second square bracket is the phase change caused by the tripled frequency through the frequency conversion fiber. In equation (11), $\beta_{30}$ and $\beta_3$ are propagation constants of the tripled frequency in the guiding fiber and the micro-nano fiber, $j_{50}$ and $j_5$, and $j_{20}$ and $j_2$ are nonlinear overlap integrals describing SPM and XPM in the guiding fiber and in the micro-nano fiber. (Generally, a core material of the frequency conversion fiber is different from that of the guiding fiber. They should have different nonlinear refractive index coefficients $n^{(2)}$, but the values are considered to be equal herein.)

If the pump amplitude transmittance T through a functional unit is 1, equation (10) may be simplified as follows:

$$A_3 = A_0\sqrt{\eta_0}\left[\frac{1-\exp(iN\Delta)}{1-\exp(i\Delta)}\right] = A_0\sqrt{\eta_0}\left(\frac{\sin\frac{N}{2}\Delta}{\sin\frac{\Delta}{2}}\right)\exp\left[i(N-1)\frac{\Delta}{2}\right] \quad (12)$$

That is, the frequency tripled power output by the cascaded fiber is:

$$P_3 = |A_3|^2 = P_0\eta_0\left(\frac{\sin\frac{N}{2}\Delta}{\sin\frac{\Delta}{2}}\right)^2 \quad (13)$$

Correspondingly, the total frequency tripling efficiency of the cascaded fiber is:

$$\eta = \frac{P_3}{P_0} = \eta_0\left(\frac{\sin\frac{N}{2}\Delta}{\sin\frac{\Delta}{2}}\right)^2 \approx gP_0^2\left(\frac{\sin\frac{N}{2}\Delta}{\sin\frac{\Delta}{2}}\right)^2 \quad (14)$$

wherein $$\left(\frac{\sin\frac{N}{2}\Delta}{\sin\frac{\Delta}{2}}\right)^2$$

is a multi-beam interference factor, indicating that the frequency-tripled signal of the cascaded fiber is a result of the combined effect of frequency tripling in a single fiber and interference.

It can be seen from the multi-beam interference factor that when $\Delta=2m\pi(m=0, \pm1, \pm2, \ldots)$, there is a maximum value $N^2$, and these maximum values are called the primary maxima, where m is the order of the primary maximum; when $$\frac{N}{2}$$

Figure 11:
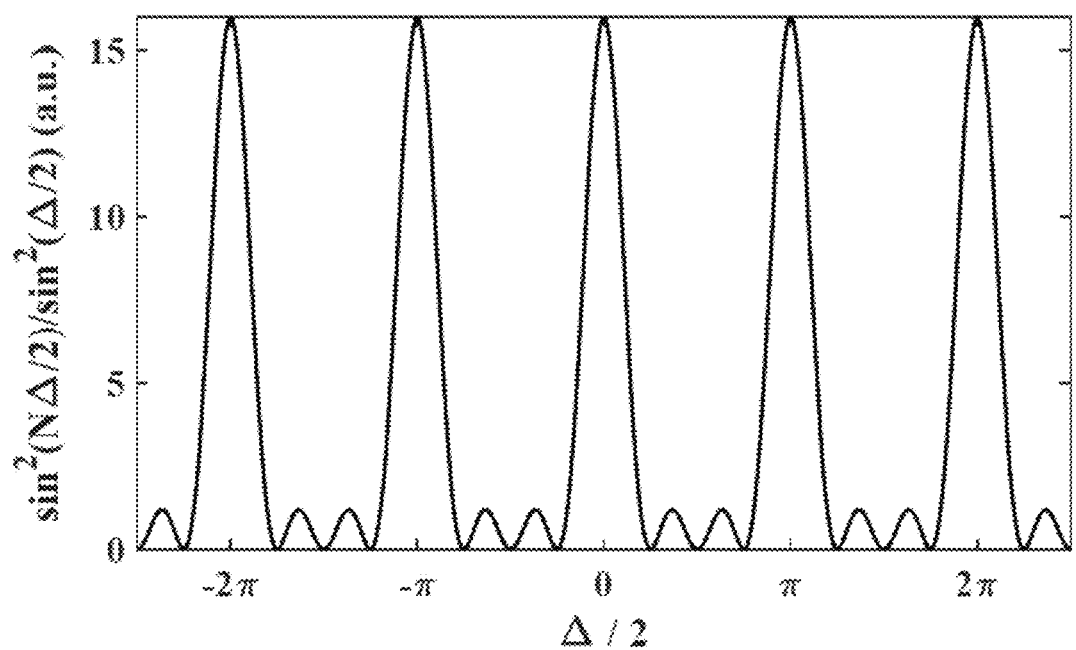
FIG. 11 is a curve graph of interference factor of N beams (N=4)

$\Delta$ is equal to an integer multiple of $\pi$ while $$\frac{\Delta}{2}$$

is not an integer multiple of $\pi$, that is, $$\frac{\Delta}{2} = \left(m + \frac{m'}{N}\right)\pi (m = 0, \pm 1, \pm 2, \ldots; m' = 1, 2, \ldots, N-1),$$

there is a minimum value, which is zero; and there is a secondary maximum between two adjacent zero values. Apparently, there are N−1 zero values and N−2 secondary maxima between two adjacent primary maxima. FIG. 11 is a curve of interference factor of N beams (N=4). A phase difference between two adjacent zero values ($\Delta m'=1$) is $\delta\Delta=2\pi/N$. Combined with equation (11), a pump power interval between two adjacent zero values can be obtained:

$$\Delta P_0 = \frac{\lambda_3}{Nn^{(2)}[(j_{50}\eta_0 + 2j_{20}T^2)L_0 + (j_5\eta_0 + 2j_2T^2)L]} \quad (15)$$

A pump power interval between the primary maximum and its adjacent zero value is also in the form of equation (15). The frequency tripled power conversion efficiency $\eta_0$ of each frequency conversion fiber is far less than 1, and the nonlinear overlap integrals $j_{50}$ and $j_{20}$ ($j_5$ and $j_2$) have the same order of magnitude. Therefore, the effect of SPM in equation (15) is much smaller than that of XPM, and if it is ignored, the following simplified form may be obtained:

$$\Delta P_0 = \frac{\lambda_3}{N2n^{(2)}T^2(j_{20}L_0 + j_2L)} \quad (16)$$

Figure 12:
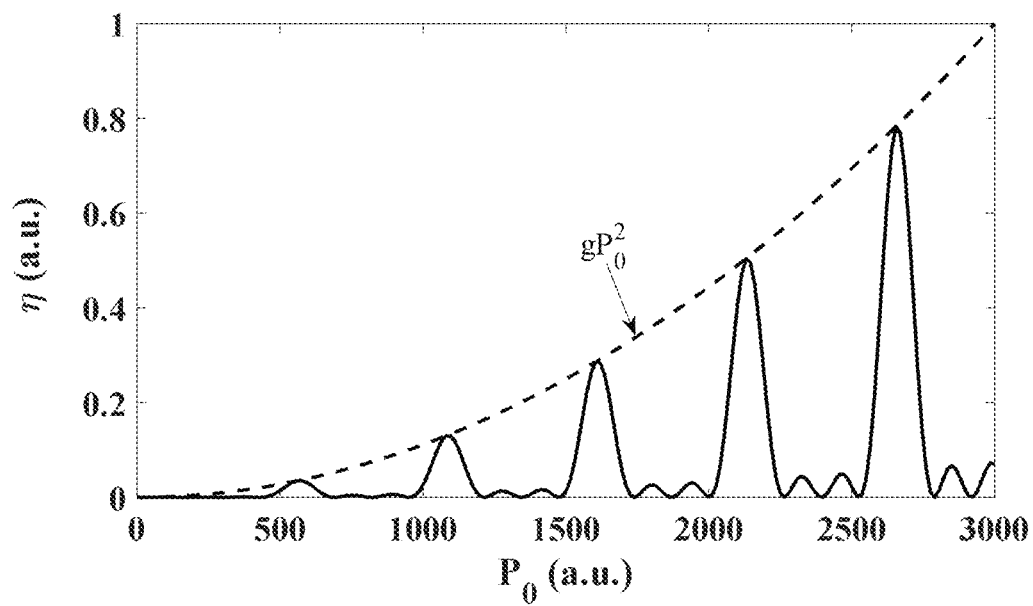
FIG. 12 is a graph showing the frequency-tripled conversion efficiency curve of a cascaded system when the cascaded fiber contains N functional units (N=4) and the pump amplitude transmittance T of each functional unit is 1.

Each level of primary maximum is modulated by the frequency tripled power conversion efficiency $gP_0^2$ of a single fiber, that is, the primary maximum of the conversion efficiency of each level is $\eta=N^2gP_0^2$. FIG. 12 can be obtained by combining equation (14) and equation (11). FIG. 12 is a graph showing a frequency tripling efficiency curve of a cascaded fiber when the cascaded fiber contains N functional units (N=4) and the pump amplitude transmittance T of each functional unit is 1, where the dotted line is a curve of the frequency tripled power conversion efficiency factor generated by a functional unit.

Figure 13:
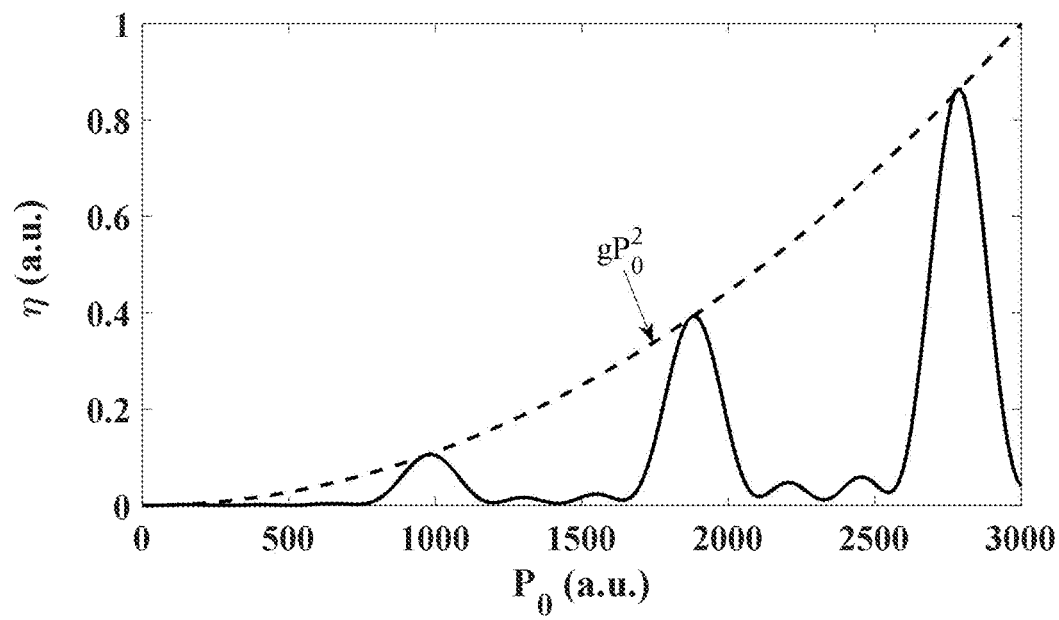
FIG. 13 is a graph showing the frequency-tripled conversion efficiency curve of a cascaded system when the cascaded fiber contains N functional units (N=4) and the pump amplitude transmittance T of each functional unit is 0.76.

When the pump amplitude transmittance T of a functional unit in equation (10) is less than 1, the above-mentioned rule still exists, but as shown in equation (16), the value of T will affect the interval between the primary maxima. Referring to FIG. 13, FIG. 13 is a graph showing a frequency tripling efficiency curve of a cascaded fiber when a cascaded fiber contains N functional units (N=4) and the pump amplitude transmittance T of each functional unit is 0.76, where the dotted line is a curve of the frequency tripled power conversion efficiency factor generated by a functional unit.

It can be understood that an optical signal from the output end of the cascaded fiber is mixed with the frequency-multiplied light generated by frequency conversion and the remaining fundamental frequency light that has not been converted. An optical filter may be connected to the output end of the cascaded fiber, to filter an output signal of the cascaded fiber in a specific band and obtain the required frequency-multiplied signal.

Further, the preset fiber diameter ranges from 765.5 nm to 767 nm.

The preset fiber length is 3 mm.

Figure 15:
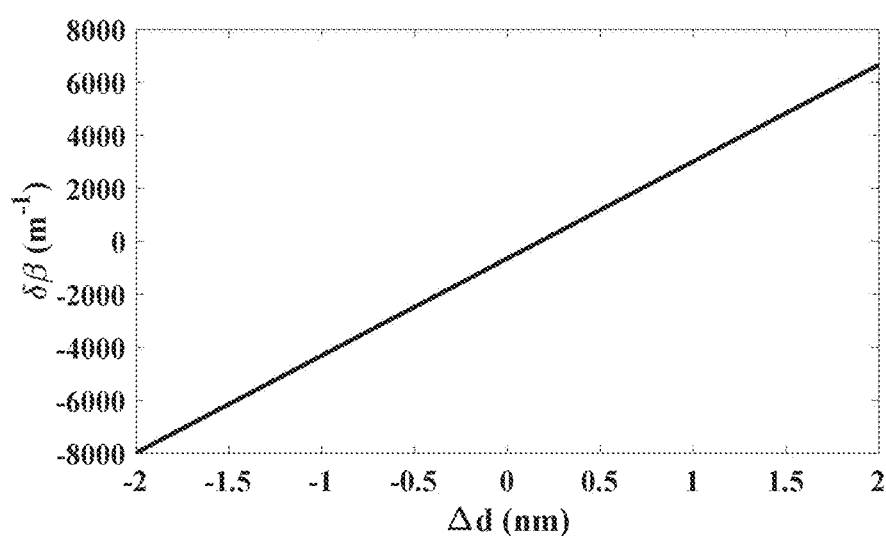
FIG. 15 is a diagram showing the linear propagation constant mismatch between pump light and frequency-tripled light against the diameter deviation, when the actual fiber diameter deviates from the corrected preset fiber diameter.

It should be noted that, in the embodiments of the present application, reference may be made to FIG. 15 when a micro-nano fiber is prepared according to the corrected preset fiber diameter $d_2=766.30$ nm. FIG. 15 shows a relationship between a diameter deviation and a linear propagation constant mismatch between pump light and frequency-tripled light when an actual fiber diameter deviates from a corrected preset fiber diameter. According to the existing research results, it is estimated that a maximum deviation of the fiber diameter is about 1 nm, then the linear propagation constant mismatch is $\delta\beta \approx 2000$ m$^{-1}$. The incident power of the pump light is around 2000 W, and then the total propagation constant mismatch can be roughly estimated to be $\delta\beta_{tot} \approx 1000$ m$^{-1}$. Therefore, based on the coherence length of the fundamental frequency light and the frequency-tripled light, $L_c \approx \pi/\delta\beta_{tot}$, $\delta\beta_{tot}$ is the total propagation constant mismatch, and the coherence length of the fundamental frequency light and the frequency-tripled light is $L_c \approx 3$ mm. Numerical simulations and existing test results show that a frequency conversion fiber length of 3 mm is suitable, and this length is easy to implement on general micro-nano fiber manufacturing devices.

The following describes the implementation process of the optical frequency conversion method in the embodiments of the present disclosure.

To adjust the power of the pump light incident on the cascaded fiber, an optical amplifier and an adjustable optical attenuator are added after the pump light source. The optical amplifier is used to increase the optical power, and the optical attenuator is used to flexibly control the actual pump power incident to the system. A quasi-continuous light is used to pump the fiber, and the wavelengths of the pump light and frequency-tripled light in vacuum are $\lambda_1=1550$ nm and $\lambda_3=517$ nm respectively. A material of the micro-nano fiber is silicon dioxide ($SiO_2$), outside the fiber is air, and a typical nonlinear refractive index coefficient of $SiO_2$ is $n^{(2)}=2.7\times10^{-20}$ m$^2$/W.

An eigenvalue equation for the modes in fiber is solved, to obtain a relationship that effective refractive indices of fundamental frequency light $HE_{11}(\omega_1)$ in fundamental mode and frequency-tripled light in different modes change with diameters of a micro-nano fiber, as shown in FIG. 14. In FIG. 14, a thick solid line represents the fundamental mode fundamental frequency light, and a thin solid line and a thin dashed line represent the frequency-tripled light. From FIG. 14, a fiber diameter at an intersection of the fundamental mode $HE_{11}(\omega_1)$ of the fundamental frequency and the mode $HE_{12}(3\omega_1)$ of the tripled frequency, $d_1=766.48$ nm, can be obtained. At this point, the two wave modes have the same effective refractive index, that is, their linear propagation constants in the micro-nano fiber are the same, which roughly meets the phase matching condition. The fiber diameter is the preset fiber diameter of the micro-nano fiber.

Figure 5:
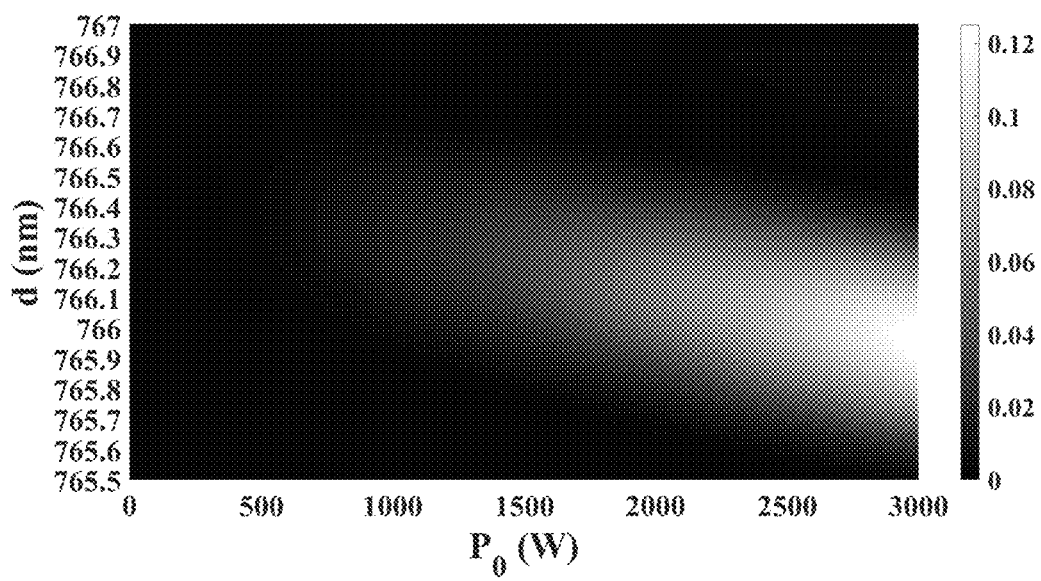
FIG. 5 is a diagram showing a frequency-tripled conversion efficiency at the end of a fiber against the fiber core diameter d and the incident pump light power $P_0$ when a micro-nano fiber with the length of 3 mm is used.

Equations (4), (5) and (6) are solved by using numerical methods, to obtain the relationship $\eta-d-P_0$, as shown in FIG. 5. FIG. 5 shows an expected conversion efficiency of the tripled frequency (losses of the pump light and frequency-tripled light is not considered) when a frequency conversion fiber with a length of 3 mm is used, the fiber core diameter d is between 765.5 nm and 767 nm, and incident power $P_0$ of the pump light is between 0 W and 3000 W. It can be seen that when the nonlinear phase shift introduced by SPM/XPM is taken into account, the conversion efficiency of the tripled frequency is low at the preset fiber diameter $d_1=766.48$ nm. If the incident power of the pump light is set to be around 2000 W, the modified preset fiber diameter $d_2=766.30$ nm can be used, and the fiber can be manufactured according to this value. It should be noted that due to the diameter accuracy for micro-nano fiber preparation, the surface of the micro-nano fiber has a random roughness; therefore, the value of the modified preset fiber diameter is not unique, but can be optimized through actual tests.

Reference may be made to FIG. 15 when a micro-nano fiber is prepared according to the modified preset fiber diameter $d_2=766.30$ nm. FIG. 15 shows a relationship between the diameter deviation and the linear propagation constant mismatch between the pump light and frequency-tripled light when an actual fiber diameter deviates from a modified preset fiber diameter. According to the existing research results, it is estimated that a maximum deviation of the fiber diameter is about 1 nm, then the linear propagation constant mismatch is $\delta\beta\approx2000$ m$^{-1}$. The incident power of the pump light is around 2000 W, and then the total propagation constant mismatch can be roughly estimated to be $\delta\beta_{tot}\approx1000$ m$^{-1}$. Therefore, according to equation (9), the coherence length of the fundamental frequency light and the frequency-tripled light is $L_c\approx3$ mm. Numerical simulations and existing test results show that a micro-nano fiber length of 3 mm is suitable, and this length is easy to implement on general micro-nano fiber manufacturing devices.

By tapering single-mode silica fiber through adiabatic stretching, four micro-nano fibers are prepared. The diameter of the micro-nano fibers is set to $d_2=766.30$ nm. For simplicity, the length of each micro-nano fiber is set to 3 mm, that is, $L_1=L_2=L_3=L_4=3$ mm.

The single-mode fiber has a numerical aperture NA=0.14 at the fundamental wavelength of 1550 nm, and a power loss coefficient of $\alpha_1=0.5$ dB/km. The wavelength of the frequency-tripled light is 517 nm, deviating from the low-loss window of the single-mode fiber. For rough numerical analysis, it is assumed that the power loss of the frequency-tripled light is approximately 20 times the fundamental frequency light, that is, $\alpha_3=10$ dB/km. The micro-nano fiber is formed by tapering a single-mode fiber, and the untapered part of the single-mode fiber is used as a guiding fiber. Five guiding fibers of the same length are used. Considering the actual needs for connection, the length of the guiding fibers is set to $L_{10}=L_{20}=L_{30}=L_{40}=L_{50}=50$ cm.

The frequency conversion fibers and the guiding fibers are sequentially connected into a cascaded fiber according to FIG. 4, where an input end and an output end for optical signals in the cascaded fiber are both guiding fibers.

The fundamental-frequency pump light with a wavelength of 1550 nm is coupled from the guiding fiber with a length of $L_{10}$ into the cascaded fiber, the light output from the guiding fiber with a length of $L_{50}$ is coupled to the fiber filter, and the frequency-tripled light with a wavelength of 517 nm is observed with a spectrometer. The incident pump power is adjusted until the power of the frequency-tripled signal reaches the primary maximum.

To make advantages of the embodiments of the present disclosure clearer, the following describes the technical effects of the embodiments of the present disclosure with reference to FIG. 6 to FIG. 9. FIG. 6 to FIG. 9 show the conversion efficiency of the tripled frequency when the cascaded fiber has different parameters.

Figure 6:
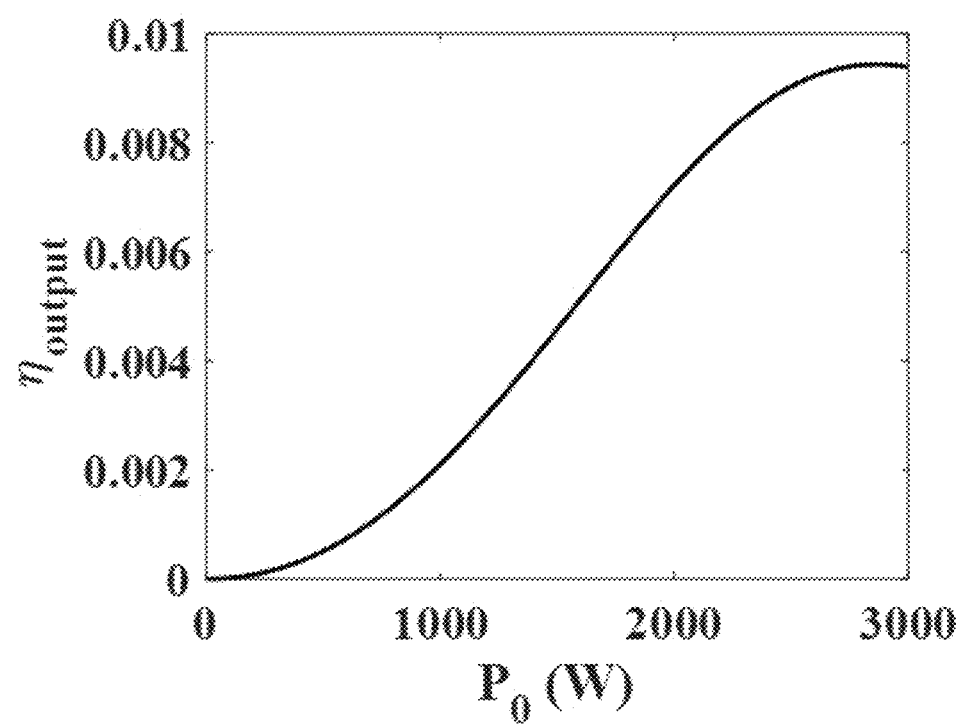
FIG. 6 is a diagram showing a relationship between the frequency-tripled conversion efficiency and the incident pump power when the cascading number N of micro-nano fibers is 1 and the fiber length L is 3 mm.

FIG. 6 is a diagram showing a relationship between the frequency-tripled conversion efficiency and the incident pump power when the number N of micro-nano fibers is 1 and the length L is 3 mm. The output efficiency $\eta_{output}$ increases monotonously with the incident pump power $P^0$, but due to the limited interaction length, even if $P_0$ is increased to 3000 W, the conversion efficiency is still less than 1%.

Figure 7:
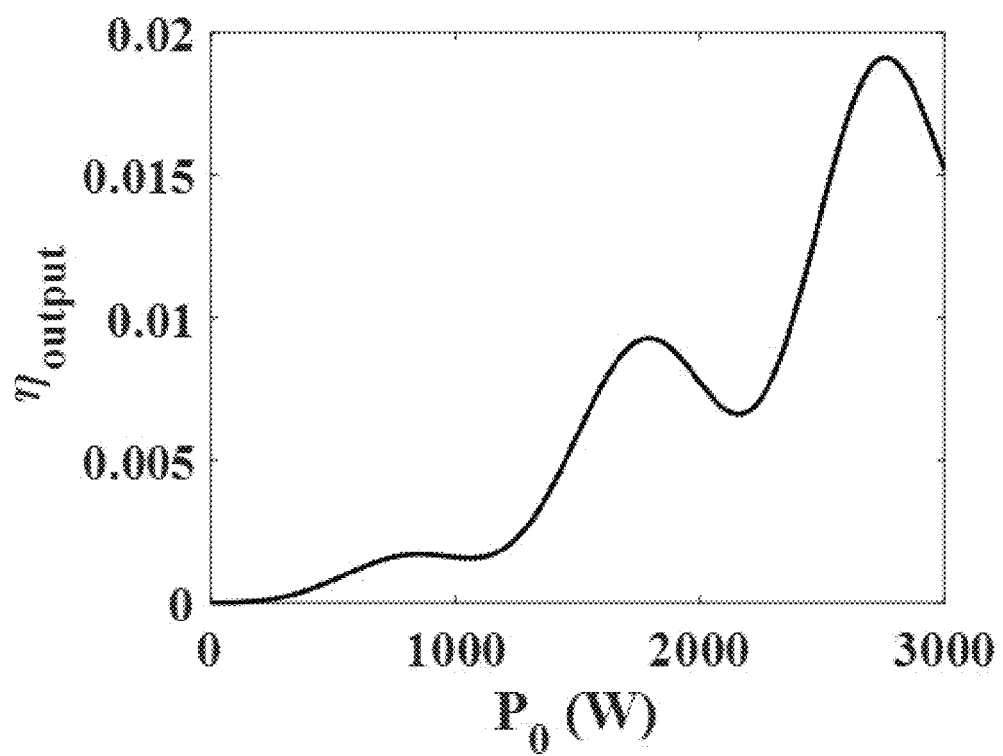
FIG. 7 is a diagram showing a relationship between the frequency-tripled conversion efficiency and the incident pump power when the cascading number N of micro-nano fibers is 1 and the fiber length L is 12 mm.

FIG. 7 is a diagram showing a relationship between the frequency-tripled conversion efficiency and the incident pump power when the number N of micro-nano fibers is 1 and the length L is 12 mm. Because L exceeds the coherence length $L_c$, the frequency tripled power oscillates along the propagation direction. The incident pump power $P^0$ affects the oscillation period through a nonlinear phase shift, and an output from the end of the frequency conversion fiber may be a peak value or a valley value of the frequency tripled power oscillation, or any value between them. Therefore, there will be some optimal incident pump power values. For example, in FIG. 7, the frequency tripled output efficiency reaches the local optima at $P_0=1794$ W and $P_0=2759$ W. Compared with FIG. 6, although the interaction length of the waves is increased by 4 times, the oscillation of the tripled frequency along the propagation direction limits the overall frequency conversion effect, and the conversion efficiency is less than 2%. Moreover, a 12 mm long micro-nano fiber is more difficult to prepare, and is more fragile, affecting robustness of the frequency tripling system.

Figure 8:
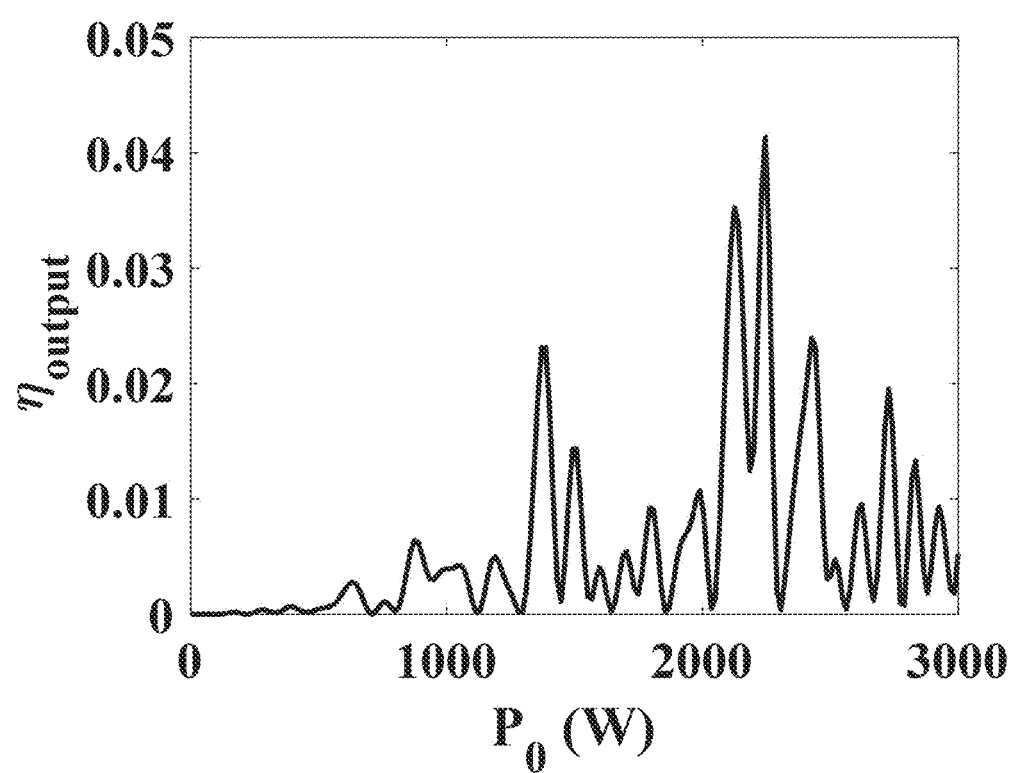
FIG. 8 is a diagram showing a relationship between the frequency-tripled conversion efficiency and the incident pump power when the cascading number N of micro-nano fibers is 1 and the fiber length L is 100 mm.

FIG. 8 is a diagram showing a relationship between the frequency-tripled conversion efficiency and the incident pump power when the number N of micro-nano fibers is 1 and the length L is 100 mm. Compared with FIG. 7, because of the longer interaction length, the oscillation of the frequency tripled power is greater, more local optima appear, and the maximum conversion efficiency of 4% is achieved at $P_0=2246$ W. In this case, the random surface roughness of the micro-nano fiber has a great impact. The relationship between the frequency tripled power and the incident pump power is irregular, and it is impossible to predict the output tripled frequency when the incident pump power is increased. The frequency conversion process has no obvious rules and is difficult to control.

Figure 9:
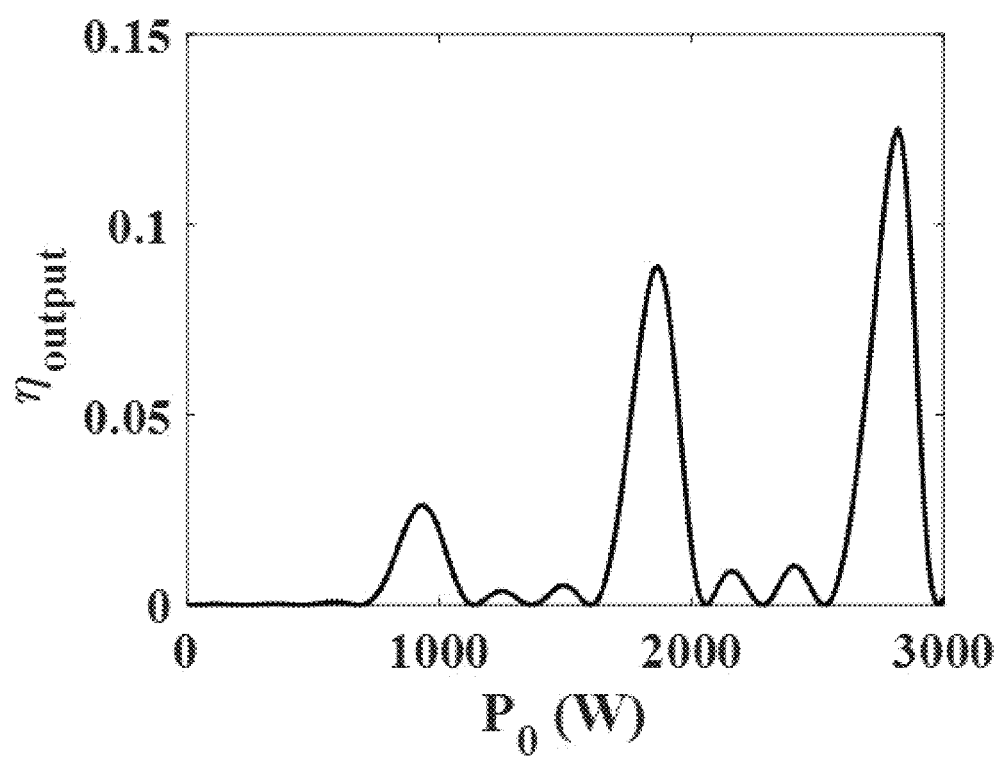
FIG. 9 is a diagram showing a relationship between the frequency-tripled conversion efficiency and the incident pump power when the cascading number N of micro-nano fibers is 4 and the fiber length L of each micro-nano fiber is 3 mm.

FIG. 9 is a diagram showing a relationship between the frequency-tripled conversion efficiency and the incident pump power when the number N of micro-nano fibers is 4 and the length L of each micro-nano fiber is 3 mm. There are three primary maxima on the curve, and the primary maxima increase with the increase of the pump power: $\eta_{output}$=2.62% when $P_0$=935 W, $\eta_{output}$=8.89% when $P_0$=1869 W, and $\eta_{output}$=12.51% when $P_0$=2819 W. There are two secondary maxima between two adjacent primary maxima. This process can be understood as multi-beam interference at the output end of the system, which is caused by superposition of the frequency-tripled signals generated from different micro-nano fibers. When the frequency-tripled signals are in phase, the output frequency-tripled signal is strengthened in the interference; when the frequency-tripled signals are out of phase, the output frequency-tripled signal is weakened in the interference.

According to comparison between FIG. 6 and FIG. 9, cascading frequency conversion fibers of the same short length can significantly improve the frequency-tripled conversion efficiency. According to comparison between FIG. 7, FIG. 8, and FIG. 9, dividing a longer micro-nano fiber into several sections and then cascading them can improve the overall frequency conversion efficiency, with more regular frequency-tripled signals and higher controllability. When the frequency-tripled light generated by the cascaded micro-nano fibers is coherently superimposed, the overall output characteristics of the frequency-tripled signal depends on the multi-beam interference characteristic, and thus the random influence of the surface roughness of the micro-nano fibers is reduced.

Figure 10:
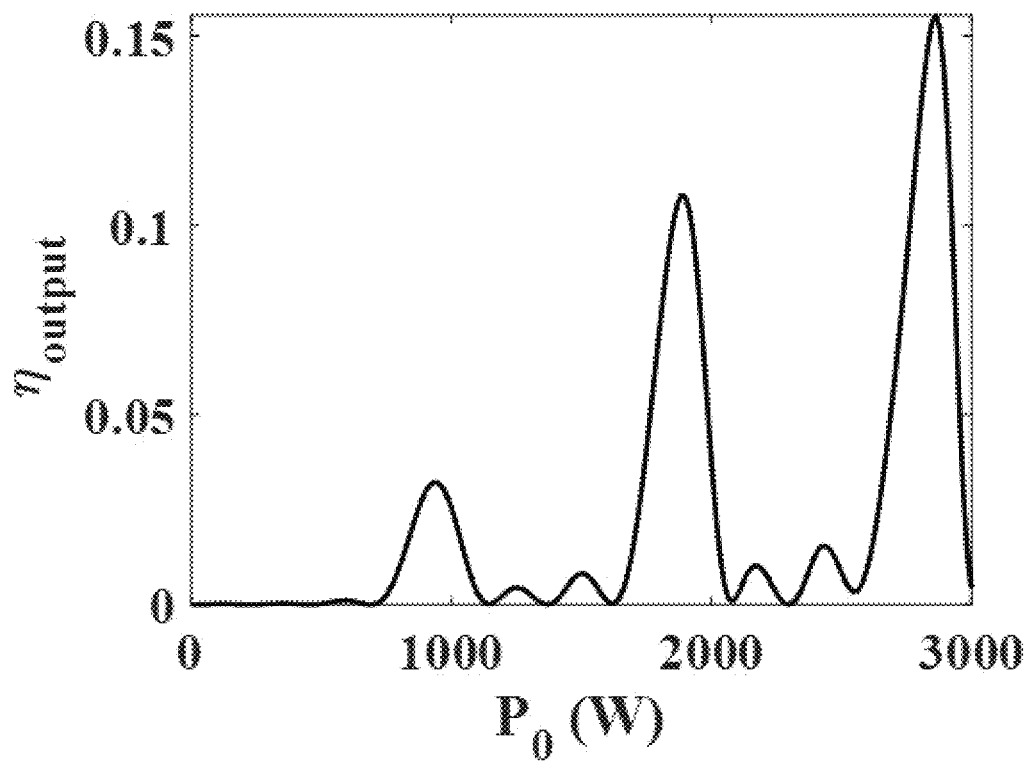
FIG. 10 is a diagram showing a relationship between the frequency-tripled conversion efficiency and the incident pump power when the cascading number N of micro-nano fibers is 4 and the lengths of micro-nano fibers are 2.7 mm, 3 mm, 3.1 mm, and 3.2 mm; and the 4 micro-nano fibers have different random diameter fluctuation.

It should be noted that the four frequency conversion fibers in FIG. 9 are completely the same. This is only an ideal situation, because any fiber manufacturing device has manufacturing errors, each manufacturing process will be affected by random factors, and it is impossible to produce completely identical frequency conversion fibers or guiding fibers. For the effect of the actual manufacturing errors, refer to FIG. 10. FIG. 10 is a diagram showing a relationship between the frequency-tripled conversion efficiency and the incident pump power when the number N of micro-nano fibers is 4 and the micro-nano fibers have different random diameter fluctuations and are 2.7 mm, 3 mm, 3.1 mm, and 3.2 mm long. It can be found that when the micro-nano fibers are slightly different due to manufacturing errors, the primary maxima vary, but the law of the frequency-tripled signal does not change obviously. Therefore, the optical frequency conversion method of the present disclosure has a relatively high tolerance to manufacturing errors of system components, and cascaded fibers are easier to obtain.

Figure 3:
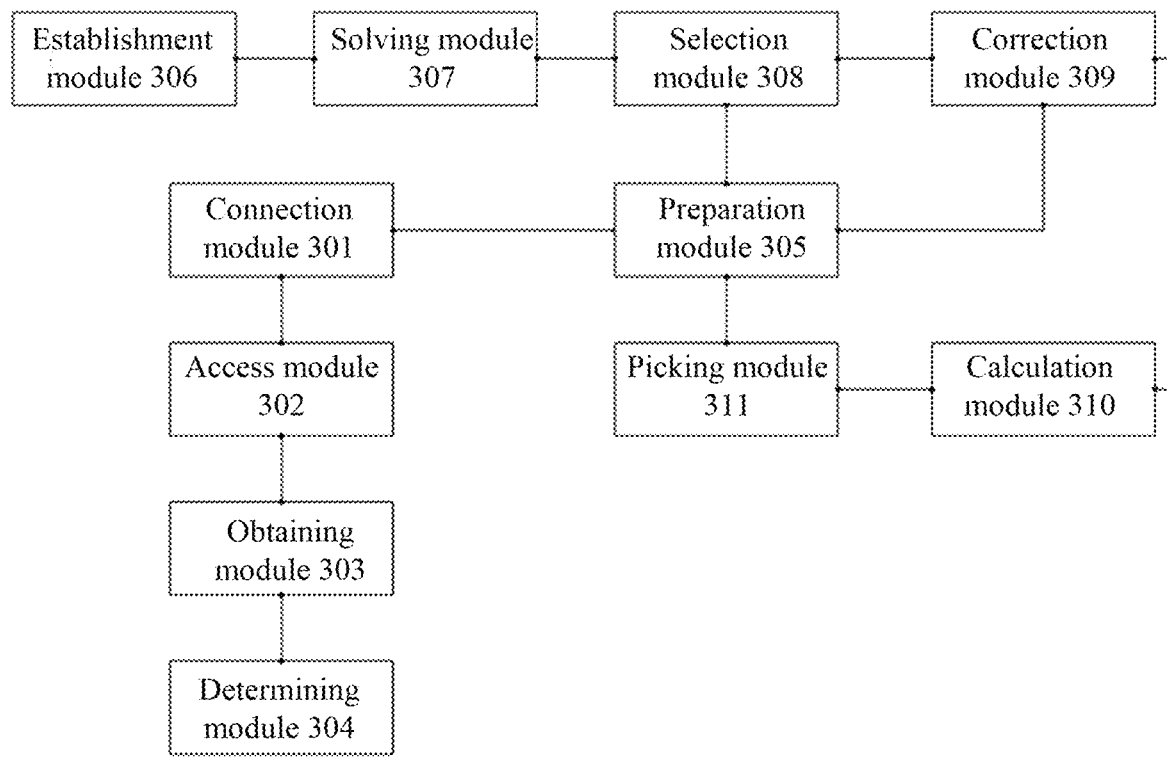
FIG. 3 is a schematic structural diagram of an optical frequency conversion apparatus according to one embodiment of the present disclosure.

For ease of understanding, referring to FIG. 3, the present disclosure further provides an embodiment of an optical frequency conversion apparatus, including:

a connection module 301, configured to connect a first quantity of micro-nano fibers and a second quantity of guiding fibers sequentially in a manner that each end of each micro-nano fiber is connected with a guiding fiber, to obtain a cascaded fiber;

an access module 302, configured to connect a pump light source to an input end of the cascaded fiber, and input a fundamental-frequency pump light signal to the cascaded fiber through the pump light source;

an obtaining module 303, configured to obtain, at an output end of the cascaded fiber, a frequency-tripled signal after optical frequency conversion, where the length of each micro-nano fiber is not greater than the coherence length of the fundamental-frequency pump light signal and the frequency-tripled signal;

a determining module 304, configured to determine whether the frequency-tripled optical signal is a primary maximum of multi-beam interference, and if not, adjust power of the fundamental-frequency pump light signal until the frequency-tripled optical signal reaches the primary maximum of multi-beam interference;

a preparation module 305, configured to prepare the micro-nano fiber according to a preset fiber diameter and a preset fiber length;

an establishment module 306, configured to establish an eigenvalue equation for hybrid guiding modes in a fiber;

a solving module 307, configured to solve the eigenvalue equation to obtain a relationship between effective refractive indices of different modes and fiber core diameters;

a selection module 308, configured to use, based on the relationship between effective refractive indices and fiber core diameters, a fiber core diameter that satisfies phase matching between the fundamental mode of the fundamental frequency and a higher-order mode of the tripled frequency as the preset fiber diameter;

a correction module 309, configured to correct the preset fiber diameter based on a preparation accuracy of the micro-nano fiber and an optical power range of the pump light source;

a calculation module 310, configured to calculate, based on a propagation constant mismatch between pump light of the pump light source and frequency-tripled light in the micro-nano fiber, a coherence length of the pump light and the frequency-tripled light; and a picking module 311, configured to pick a fiber length less than or equal to the coherence length as the preset fiber length.

The present disclosure further provides an optical frequency conversion device, where the device includes a processor and a memory;

the memory is configured to store program code and transmit the program code to the processor; and the processor is configured to execute the optical frequency conversion method in the foregoing optical frequency conversion method embodiments according to instructions in the program code.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts shown as units may or may not be physical units, which may be located in one position, or may be distributed on a plurality of network units. Some or all of the units may be selected according to actual requirements to achieve the objectives of the solutions in the embodiments.

In addition, function units in the embodiments of the present disclosure may be integrated into one processing unit, or each of the units may exist alone physically, or two or more units are integrated into one unit. The above integrated unit may be implemented either in a form of hardware or in a form of a software functional unit.

The integrated unit, if implemented in the form of a software functional unit and sold or used as a stand-alone product, may be stored in a computer-readable storage medium. Based on such understanding, the technical solution in the present disclosure essentially, or the part contributing to the prior art, or some of the technical solutions may be embodied in a form of a software product. The computer software product is stored in a storage medium, and includes several instructions to enable a computer device (which may be a personal computer, a server, a network device, or the like) to execute all or some steps of the method according to the embodiments of the present disclosure. The foregoing storage medium includes: any medium that can store program code, such as a USB flash disk, a removable hard disk, a read-only memory (ROM), a random access memory (RAM), a magnetic disk, or an optical disc.

Finally, it should be noted that the foregoing embodiments are merely used to explain the technical solutions of the present invention, but are not intended to limit the same. Although the present invention is described in detail with reference to the foregoing embodiments, those of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions of the embodiments of the present invention.

What is claimed is:

1. An optical frequency conversion method, comprising:
   connecting a first quantity of micro-nano fibers and a second quantity of guiding fibers sequentially in a manner that each end of each micro-nano fiber is connected with a guiding fiber, to obtain a cascaded fiber;
   connecting a pump light source to an input end of the cascaded fiber, and inputting a fundamental-frequency pump light signal to the cascaded fiber through the pump light source;
   obtaining, at an output end of the cascaded fiber, a frequency-tripled signal after optical frequency conversion; and
   determining whether the frequency-tripled optical signal is a primary maximum of multi-beam interference, and if not, adjusting power of the fundamental-frequency pump light signal until the frequency-tripled optical signal reaches the primary maximum of multi-beam interference, wherein
   a length of each micro-nano fiber is not greater than a coherence length of the fundamental-frequency pump light signal and the frequency-tripled signal.

2. The optical frequency conversion method according to claim 1, further comprising:
   preparing the micro-nano fiber according to a preset fiber diameter and a preset fiber length.

3. The optical frequency conversion method according to claim 2, further comprising: before preparing the micro-nano fiber according to a preset fiber diameter and a preset fiber length,
   establishing an eigenvalue equation for hybrid guiding modes in a fiber;
   solving the eigenvalue equation to obtain relationships in different modes between an effective refractive index and a fiber core diameter; and
   using, based on the relationships between the effective refractive index and the fiber core diameter, a fiber core diameter that satisfies phase matching between a fundamental mode of a fundamental frequency and a higher-order mode of a tripled frequency as the preset fiber diameter.

4. The optical frequency conversion method according to claim 3, further comprising:
   correcting the preset fiber diameter based on a preparation accuracy of the micro-nano fiber and an optical power range of the pump light source.

5. The optical frequency conversion method according to claim 2, further comprising: before preparing the micro-nano fiber according to a preset fiber diameter and a preset fiber length,
   calculating, based on a propagation constant mismatch between pump light of the pump light source and frequency-tripled light in the micro-nano fiber, a coherence length of the pump light and the frequency-tripled light; and
   picking a fiber length less than or equal to the coherence length as the preset fiber length.

6. The optical frequency conversion method according to claim 2, wherein the preset fiber diameter ranges from 765.5 nm to 767 nm.

7. The optical frequency conversion method according to claim 2, wherein the preset fiber length is 3 mm.

8. An optical frequency conversion device, comprising a processor and a memory, wherein
   the memory is configured to store program code and transmit the program code to the processor; and
   the processor is configured to execute, according to instructions in the program code, the optical frequency conversion method according to claim 1.

9. An optical frequency conversion apparatus, comprising:
   a connection module, configured to connect a first quantity of micro-nano fibers and a second quantity of guiding fibers sequentially in a manner that each end of each micro-nano fiber is connected with a guiding fiber, to obtain a cascaded fiber;
   an access module, configured to connect a pump light source to an input end of the cascaded fiber, and input a fundamental-frequency pump light signal to the cascaded fiber through the pump light source;
   an obtaining module, configured to obtain, at an output end of the cascaded fiber, a frequency-tripled signal after optical frequency conversion; and
   a determining module, configured to determine whether the frequency-tripled optical signal is a primary maximum of multi-beam interference, and if not, adjust power of the fundamental-frequency pump light signal until the frequency-tripled optical signal reaches the primary maximum of multi-beam interference, wherein
   a length of each micro-nano fiber is not greater than a coherence length of the fundamental-frequency pump light signal and the frequency-tripled signal.

10. The optical frequency conversion apparatus according to claim 9, further comprising:
    a preparation module, configured to prepare the micro-nano fiber according to a preset fiber diameter and a preset fiber length;
    an establishment module, configured to establish an eigenvalue equation for hybrid guiding modes in a fiber;
    a solving module, configured to solve the eigenvalue equation to obtain relationships in different mode between an effective refractive index and a fiber core diameter;

a selection module, configured to use, based on the relationships between the effective refractive index and the fiber core diameter, a fiber core diameter that satisfies phase matching between a fundamental mode of a fundamental frequency and a higher-order mode of a tripled frequency as the preset fiber diameter;

a correction module, configured to correct the preset fiber diameter based on a preparation accuracy of the micro-nano fiber and an optical power range of the pump light source;

a calculation module, configured to calculate, based on a propagation constant mismatch between pump light of the pump light source and frequency-tripled light in the micro-nano fiber, a coherence length of the pump light and the frequency-tripled light; and a picking module, configured to pick a fiber length less than or equal to the coherence length as the preset fiber length.

* * * * *